Jan. 17, 1928.
S. ASPIS
1,656,852
COMBINATION OF HAND BAG OR LIKE PORTABLE RECEPTACLE
AND COLLAPSIBLE PHOTOGRAPHIC CAMERA
Filed March 20, 1926
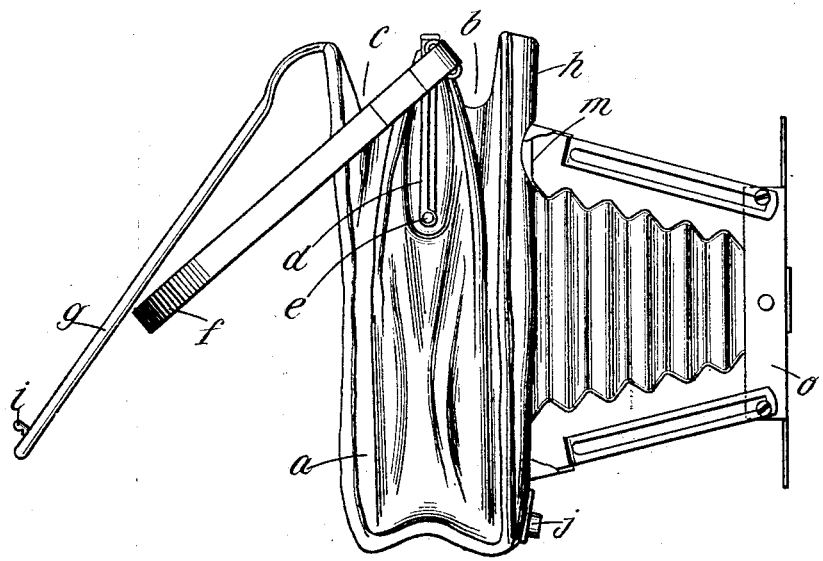
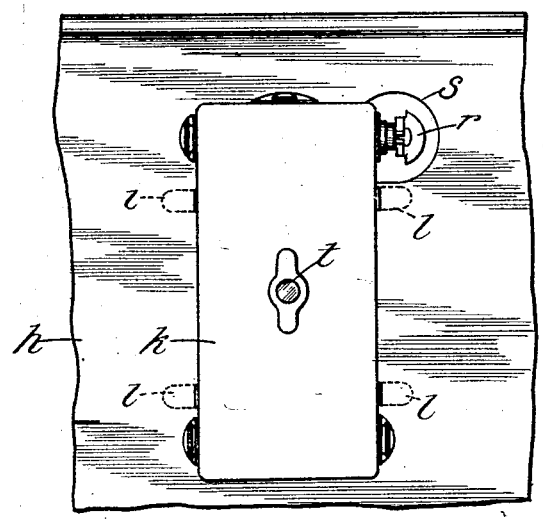 
INVENTOR:
Samuel Aspis
By Richards & Geier
Attys.

Patented Jan. 17, 1928.

1,656,852

UNITED STATES PATENT OFFICE.

SAMUEL ASPIS, OF LONDON, ENGLAND.

COMBINATION OF HAND BAG OR LIKE PORTABLE RECEPTACLE AND COLLAPSIBLE PHOTOGRAPHIC CAMERA.

Application filed March 20, 1926, Serial No. 96,130, and in Great Britain September 18, 1925.

This invention relates to the combination of a hand-bag, lady's "vanity case," or like portable receptacle, with a collapsible photographic camera adapted for using a spool-mounted multiple film, the invention consisting in an improved and very compact arrangement wherein the camera forms an integral part of the complete receptacle, from within which the winding of the film can be effected, the shallow detachable back-plate of the camera being a permanent fixture immediately behind an opening in the front of the receptacle, of corresponding shape and dimensions, through which the remainder of the camera can be withdrawn in the forward direction at will; whilst that rear frame of the camera which carries the film-spools lies wholly within or projects rearward of the boundary constituted by the front of the receptacle so that the front of the camera, when collapsed, extends in a plane substantially coincident with the general plane of the front of the receptacle.

An example of the invention is illustrated in the accompanying drawings, wherein Figure 1 is a side elevation of a lady's hand-bag, shown as open and with the camera extended for use; Figure 2 is an inside face view of part of the front of the hand-bag, shewing the back of the camera; and Figure 3 is a vertical section of the front of the hand-bag with the back of the camera attached thereto and the immediately adjacent part of the camera in normal position relatively to the back.

The hand-bag $a$, of any ordinary or convenient type of construction, is shewn as having a front and a rear pocket the mouths of which are indicated at $b$ and $c$ respectively in Figure 1, and a middle pocket the mouth of which is normally closed by a hinged frame $d$ whereof the hinge is indicated at $e$; the loop handle $f$ being attached to the upper corners of the frame $d$. The mouths of the pockets $b$ and $c$ are normally closed by a flap $g$, which in Figure 1 is shewn as thrown back to afford access to the interior of the bag, but which in use hangs down over the front $h$ of the bag so as to cover the same wholly or partially, the flap $g$ being adapted to be then secured by a fastening whereof the two principal members are indicated at $i$ and $j$ respectively.

The camera is of the well-known type having a shallow detachable back-plate such as $k$ serving to shield the rear of the film and spool-compartments, and according to the present invention this back-plate is made a permanent fixture in the front $h$ of the bag immediately behind an opening therein of corresponding shape and dimensions through which the remainder of the camera can be withdrawn in the forward direction at will; the backplate $k$ being provided with lugs or equivalent projections such as $l$ . . . adapted to be stitched or otherwise secured to the material forming the front $h$ of the bag.

The rear-frame $m$ of the camera, carrying or forming the film and spool-compartments, may make the usual sliding friction-tight fit between the forwardly-projecting flanges $n$ of the back-plate $k$; the rear-frame $m$, when in position, lying wholly within or projecting rearward of the boundary constituted by the front $h$ of the bag; whilst the camera-front $o$, when the camera is collapsed, lies close against the outer face of the rear-frame $m$ so as to extend in a plane approximately or substantially coincident with the general plane of the front $h$ of the bag, as indicated in Figure 3. In Figure 1 the camera-front $o$ is shewn as projected into operative position with the bellows $p$ extended. When the camera is collapsed and the flap $g$ of the bag is closed, the camera is wholly concealed from view, and the bag presents an appearance indistinguishable from that of an ordinary hand-bag of the same style, whilst the interior of the bag is left practically free from obstruction.

The spool-winding handle $r$ projects as usual from one side of the rear-frame $m$ of the camera, and in order to allow of its being manipulated by the fingers when the rear-frame $m$ is in position in the back-plate $k$, the opening in the bag-front $h$ is enlarged as at $s$ (Figure 2) to clear the handle $r$, which, as will be seen from Figure 3, can be reached from inside the front pocket of the bag. From within this pocket (i. e. from the rear of the bag-front $h$) can also readily be seen the usual window $t$ provided in the back-plate $k$ for viewing the numbers of the individual films.

I claim:—

A mounting for collapsible cameras including a receptacle having outer walls and a compartment therebetween, only one of said walls being provided with an opening therein, a camera casing having film winding means thereon fitted in said opening with one face thereof disposed substantially in the plane of said wall and the remainder of the casing projecting inwardly into said compartment whereby to permit the collapsible part of the camera to be projected laterally outwardly beyond said wall when making an exposure, the film winding means being accessible from the interior of said compartment and the latter being capable of receiving other articles while the camera casing is mounted therein, lugs carried by said casing and secured to the wall having the opening therein to position said casing in its relation to said wall, and a closure flap forming an extension of the other wall of said receptacle and secured to the first named wall to conceal the face of the camera disposed in said opening.

SAMUEL ASPIS.